July 29, 1952  J. A. WASKIEL  2,604,816
NOSE PAD AND ITS SUPPORT FOR OPHTHALMIC MOUNTINGS
Filed June 29, 1950

*INVENTOR.*
John A. Waskiel
BY Barlow & Barlow
ATTORNEY ously supported from
UNITED STATES PATENT OFFICE 2,604,816

NOSE PAD AND ITS SUPPORT FOR OPHTHALMIC MOUNTINGS

John A. Waskiel, Providence, R. I.

Application June 29, 1950, Serial No. 171,115

2 Claims. (Cl. 88—49)

This invention relates to an ophthalmic mounting and more particularly to the nose pad support and the nose pad supported thereon.

Nose pads have been variously supported from the nasal edges of lenses by means of an arm secured either to the lens or to a rim about the lens, and these arms provide a mounting at their free ends for nose pads which are usually of Celluloid or some non-corrosive material and are frequently so supported that they may rock upon the support to adjust themselves to the nose of the wearer. The arms are also of such length and so bent upon themselves that considerable adjustment may be provided to fit the individual's face. Heretofore, in the mounting of pads upon such a support there has been either one or two fingers, and if one of such fingers becomes broken or weakened, the nose pad becomes disconnected. Also, although there is some control of the rocking, the rocking is not as nicely controlled as may be desired.

One of the objects of this invention is to provide a nose pad mounted upon a support by more than the two fingers which have heretofore been utilized in order that the pad may be better supported from the standpoint of abusive treatment and also from the standpoint of better control of the rocking movement.

Another object of this invention is to provide a three-point support for a nose pad which will give a better controlled rocking action and better support for the pad.

Another object of this invention is to provide by reason of the three fingers an arrangement so that the fingers may be merely pressed into notches in the support rather than be threaded through openings in the support, which greatly facilitates the mounting.

With these and other objects in view, the invention consists of certain novel features of construction, as will be more fully described and particularly pointed out in the appended claims.

In proceeding with this invention, I provide a support which has an arm with an enlarged end forming a head, and I notch this head adjacent its connection to the arm and also at one other point forming a triangular relation. The pad is provided with a plate from which three fingers project in such an arrangement that they will enter notches and may be bent over the head to secure the pad thereto. The fingers are bent in rather loosely so that there is some rocking movement and yet the pad is retained in its desired position.

Figure 1:
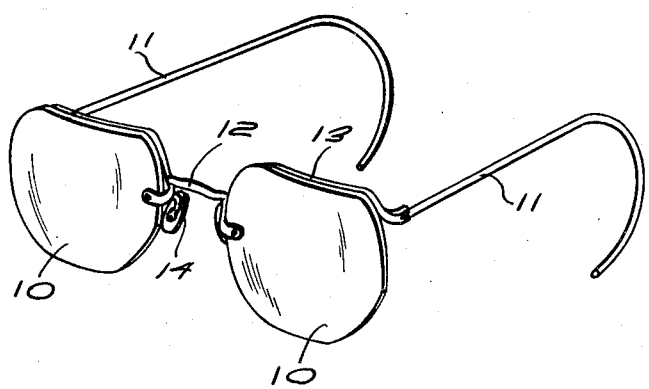
Figure 1 is a perspective view of an ophthalmic mounting which has been equipped with this invention.
Figure 5:
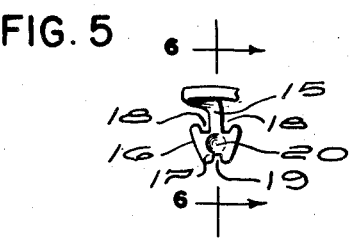
Figure 5 is a face view of a portion of the arm alone as shown in Figure 2.
Figure 6:
Figure 6 is a sectional view on line 6—6 of Figure 5.

With reference to the drawings, 10 designates the lenses having temples 11 and a bridge 12 connecting them together. The nose pad support is secured to either the metal parts of the bridge or temple supports 13 or directly to the lenses and is designated 14 in Figure 1. This nose pad support comprises an arm 15 which is usually bent into somewhat of an S-shape to provide for adjustment and is of such material that the same is readily bendable. The arm is provided with an enlarged free end or head 16 which is broad at the location adjacent the arm 15 and narrower at the end distant therefrom at 17. Notches 18, 18 (see Figure 5) are provided adjacent the arm 15, while a notch 19 is provided opposite the point of connection of the arm 15 to the head 16. This head 16 also has a rounded deflected portion 20, as shown more clearly in Figure 6.

Figure 2:
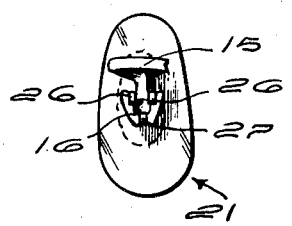
Figure 2 is an elevation looking at the rear surface of the pad and the end of the support which is attached to such pad, the arm being shown fragmentally.
Figure 3:
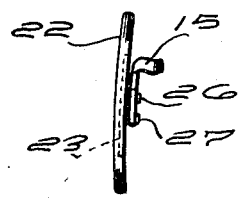
Figure 3 is an edge view of the structure shown in Figure 2.
Figure 4:
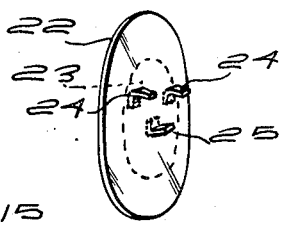
Figure 4 is a perspective view of the pad with the support removed.

The nose pad designated generally 21 is of a two ply Celluloid construction 22 with a metal plate 23 sandwiched between the two plies thereof. Fingers 24, 24 and 25 are secured to the plate 23 and project through the rear ply of the Celluloid, as shown in Figure 4, and are so located that the fingers 24, 24 will enter the notches 18, 18 and the fingers 25 will enter the notch 19. These fingers in this generally triangular relation after being positioned so as to enter the notches are bent over as at 26 and 27 in Figures 2 and 3 so as to loosely mount the pad 21 on the support. This pad may then rock both about its longitudinal as well as its lateral axis in a controlled manner and yet permit of easy detachment and a substitution of a new pad when desired. The notches by being formed in the edge of this head permit of much easier detachment and attachment than were it necessary to thread the fingers through openings in any such support.

Figure 7:
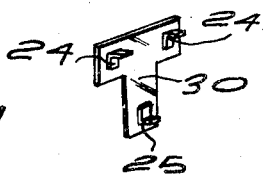
Figure 7 is a perspective view of a modified form of plate.

In some cases instead of utilizing an oval plate 23, the metal plate 30, shown as T-shaped in Figure 7, may be substituted, to which the arms 24—24 and 25 may be secured. This T-shaped plate has the advantage of indicating at once the location of the arms to the person soldering without any previous laying out.

I claim:

1. In an ophthalmic mounting, a nose pad support comprising a bendable arm with an enlarged free end forming a head with a generally flat engaging face, said head having three notches in its edge in a triangular arrangement, a curved projection on said face midway of the triangular relation of said notches, and a nose pad in face-to-face engagement with said head having three fingers extending from its rear surface each entering one of said notches and bent over the opposite face of the head and spaced therefrom to loosely mount the pad on said support and provide for adjustable rocking movement about both the longitudinal and lateral axes.

2. In an ophthalmic mounting a nose pad support comprising a bendable arm with an enlarged free end forming a head with a generally convex engaging face providing a contact about which the pad may rock, said head having two notches at the junction of the supporting arm and head and on either side of the arm opening in the direction of the longitudinal extent of the arm and a third notch in the head diametrically opposite the connection of the arm with the head and opening in the opposite direction, and a nose pad in face-to-face engagement with said head having three fingers extending from its rear surface, each entering one of said notches and bent over the opposite face of the head and spaced therefrom to loosely mount the pad on said support and provide an adjustable rocking movement of said pad about both the longitudinal and lateral axes in conjunction with the convex engaging face of said arm.

JOHN A. WASKIEL.

REFERENCES CITED

The following references are of record in the file of this patent:

UNITED STATES PATENTS

| Number | Name | Date |
|---|---|---|
| 2,035,785 | Bouchard | Mar. 31, 1936 |
| 2,080,853 | Nelson | May 18, 1937 |
| 2,274,589 | Conneely | Feb. 24, 1942 |

FOREIGN PATENTS

| Number | Country | Date |
|---|---|---|
| 312,749 | Great Britain | June 6, 1929 |